United States Patent
Osaki et al.

(10) Patent No.: US 10,239,048 B2
(45) Date of Patent: Mar. 26, 2019

(54) HYDROGENATION CATALYST FOR HEAVY HYDROCARBON OIL, PRODUCTION METHOD FOR HYDROGENATION CATALYST FOR HEAVY HYDROCARBON OIL, AND HYDROGENATION METHOD FOR HEAVY HYDROCARBON OIL

(71) Applicant: Cosmo Oil Co., Ltd., Tokyo (JP)

(72) Inventors: Takayuki Osaki, Tokyo (JP); Nobumasa Nakajima, Tokyo (JP)

(73) Assignee: COSMO OIL CO., LTD., Tokyo (JP)

( * ) Notice: Subject to any disclaimer, the term of this patent is extended or adjusted under 35 U.S.C. 154(b) by 223 days.

(21) Appl. No.: 15/021,790

(22) PCT Filed: Sep. 25, 2014

(86) PCT No.: PCT/JP2014/075455
§ 371 (c)(1),
(2) Date: Mar. 14, 2016

(87) PCT Pub. No.: WO2015/046345
PCT Pub. Date: Apr. 2, 2015

(65) Prior Publication Data
US 2016/0220986 A1 Aug. 4, 2016

(30) Foreign Application Priority Data
Sep. 27, 2013 (JP) ................... 2013-201800

(51) Int. Cl.
*B01J 27/16* (2006.01)
*B01J 23/888* (2006.01)
*B01J 27/18* (2006.01)
*B01J 27/19* (2006.01)
*C10G 45/08* (2006.01)
*B01J 35/02* (2006.01)
*B01J 37/00* (2006.01)
*B01J 23/883* (2006.01)
*C10G 65/00* (2006.01)
*B01J 37/04* (2006.01)
*B01J 35/00* (2006.01)
*B01J 35/10* (2006.01)
*B01J 37/02* (2006.01)

(52) U.S. Cl.
CPC ......... *B01J 27/1808* (2013.01); *B01J 23/883* (2013.01); *B01J 27/19* (2013.01); *B01J 35/023* (2013.01); *B01J 37/0009* (2013.01); *C10G 45/08* (2013.01); *C10G 65/00* (2013.01); *B01J 35/0006* (2013.01); *B01J 35/1019* (2013.01); *B01J 35/1042* (2013.01); *B01J 35/1061* (2013.01); *B01J 37/0201* (2013.01); *B01J 37/04* (2013.01); *B01J 2523/00* (2013.01)

(58) Field of Classification Search
CPC ........ B01J 27/1808; B01J 27/16; B01J 27/19; B01J 23/864; B01J 23/866; B01J 23/882; B01J 23/883; B01J 23/888; B01J 35/023; B01J 37/0009; B01J 35/0006; B01J 35/1019; B01J 35/1042; B01J 35/1061; B01J 37/0201; B01J 37/04; B01J 2523/00; C10G 45/08; C10G 65/00
USPC .................................................. 502/314–315
See application file for complete search history.

(56) References Cited

U.S. PATENT DOCUMENTS

| | | | |
|---|---|---|---|
| 4,652,546 A | 3/1987 | Aldag, Jr. et al. | |
| 5,686,374 A | 11/1997 | Nakaoka | |
| 6,013,598 A * | 1/2000 | Lapinski ............... | B01J 23/882 502/305 |
| 6,716,525 B1 * | 4/2004 | Yadav ................... | A61L 27/06 428/402 |
| 2004/0050754 A1 * | 3/2004 | Abe ....................... | B01J 23/85 208/216 PP |
| 2008/0227631 A1 | 9/2008 | Schmidt et al. | |
| 2016/0220985 A1 * | 8/2016 | Osaki ..................... | B01J 37/04 |
| 2016/0228858 A1 * | 8/2016 | Osaki ..................... | B01J 27/19 |

FOREIGN PATENT DOCUMENTS

| | | | | |
|---|---|---|---|---|
| CN | 101954282 A | | 1/2011 | |
| CN | 103320159 A | | 9/2013 | |
| GB | 1510155 A | * | 5/1978 | ............. B01J 27/16 |
| JP | H09248460 A | | 9/1997 | |
| JP | 2002-204959 | * | 7/2002 | ............. B01J 23/85 |
| JP | 2002204959 A | | 7/2002 | |
| JP | 2003103173 A | | 4/2003 | |
| JP | 2005314657 A | | 11/2005 | |
| JP | 2008-528266 | * | 7/2008 | ............. B01J 23/88 |
| JP | 2008528266 A | | 7/2008 | |
| JP | 2008290043 A | | 12/2008 | |
| JP | 2010248476 A | | 11/2010 | |

OTHER PUBLICATIONS

International Search Report dated Nov. 11, 2014 in International Application No. PCT/JP2014/075455.
Office Action dated Jan. 24, 2017 in CN Application No. 201480052589.8.
European Search Report dated May 29, 2017 in EP Application No. 14847234.3.
Notice of Allowance dated Oct. 9, 2018 in JP Application 2015-539341.

* cited by examiner

*Primary Examiner* — Patricia L. Hailey
(74) *Attorney, Agent, or Firm* — Panitch Schwarze Belisario & Nadel LLP

(57) ABSTRACT

The hydrogenation catalyst for heavy hydrocarbon oil, includes: as a carrier, phosphorous-zinc-containing alumina that contains 0.1% by mass to 4% by mass, in terms of oxide based on the carrier, of phosphorous and 1% by mass to 12% by mass, based on the carrier, of zinc oxide particles, and supporting, on the carrier, 8% by mass to 20% by mass, in terms of oxide based on the catalyst, of at least one selected from metals in Group 6 of the periodic table and 2% by mass to 6% by mass, in terms of oxide based on the catalyst, of at least one selected from metals in Groups 8 to 10 of the periodic table, and the average particle diameter of the zinc oxide particles being 2 μm to 12 μm.

6 Claims, No Drawings

HYDROGENATION CATALYST FOR HEAVY HYDROCARBON OIL, PRODUCTION METHOD FOR HYDROGENATION CATALYST FOR HEAVY HYDROCARBON OIL, AND HYDROGENATION METHOD FOR HEAVY HYDROCARBON OIL

CROSS-REFERENCE TO RELATED APPLICATION

This application is a Section 371 of International Application No. PCT/JP2014/075455, filed Sep. 25, 2014, which was published in the Japanese language on Apr. 2, 2015, under International Publication No. WO 2015/046345 A1, and the disclosure of which is incorporated herein by reference.

TECHNICAL FIELD

The present invention relates to a hydrogenation catalyst for heavy hydrocarbon oil used for hydrodesulfurization of atmospheric distillation residual oil (hereinafter, also referred to as "AR") and vacuum distillation residual oil (hereinafter, also referred to as "VR") using a residue desulfurization process and which is capable of improving the storage stability of a hycrogenated oil obtained by hydrogenating heavy hydrocarbon oils of atmospheric distillation residual oil and vacuum distillation residual oil, a production method for the hydrogenation catalyst, and a hydrogenation method for heavy hydrocarbon oil using the hydrogenation catalyst.

Priority is claimed on Japanese Patent Application No. 2013-201800, filed Sep. 27, 2013, the content of which is incorporated herein by reference.

BACKGROUND ART

Heavy hydrocarbon oils such as AR obtained by treating crude oil using an atmospheric distillation unit and VR obtained by further treating AR using a vacuum distillation unit contain a large amount of sulfur compounds. When these heavy hydrocarbon oils are used as a fuel without desulfurization, a large amount of sulfur compounds (SOx) are discharged into the air and the discharged sulfur causes damage to the environment. Therefore, it is necessary to reduce the amount of sulfur compounds in the heavy hydrocarbon oils.

As a result, improvements in activity and life of a hydrogenation catalyst have been studied intensively for the purpose of reducing the amount of sulfur compounds in heavy hydrocarbon oil. For example, it has been disclosed that the dispersion state of molybdenum, which is an active metal, becomes satisfactory and desulfurization performance is improved by incorporating zinc and phosphorus into an alumina carrier in an alumina-based hydrogenation catalyst (for example, refer to PTL 1).

On the other hand, heavy hydrocarbon oil is required to have improved storage stability. Hydrogenated heavy hydrocarbon oil is stored under heating to maintain fluidity until shipping in consideration of workability at the time of shipping. In addition, the oil may be stored for a long period of time after the oil is shipped as a product before use. Therefore, depending on the thermal history and the atmosphere at the time of storage, sediment is produced while the oil is stored and this sediment may cause plugging of a filter or damage to a pump.

There are several reasons why sediment is produced, one of these being due to the stability of asphaltene contained in heavy hydrocarbon oil. When asphaltene is surrounded by resin, the asphaltene is dispersed in heavy hydrocarbon oil without producing sediment. However, when resin is dissociated from asphaltene by hydrogenation and the balance between the asphaltene and the resin collapses, the asphaltene easily appears as sediment.

CITATION LIST

Patent Literature

[PTL 1] Japanese Unexamined Patent Application, First Publication No. 2008-290043

SUMMARY OF INVENTION

Technical Problem

An object of the present invention is to provide a hydrogenation catalyst capable of improving the storage stability of hydrogenated heavy hydrocarbon oil without reducing desulfurization activity or demetallization activity, a production method for the hydrogenation catalyst, and a hydrogenation method for heavy hydrocarbon oil using the hydrogenation catalyst.

Solution to Problem

In order to accomplish the above object, the present inventors have conducted extensive investigation and found, as a result, that in hydrogenation for heavy hydrocarbon oil, by using a hydrogenation catalyst which allows a hydrogenation-active component to be supported on a phosphorus-zinc-containing alumina carrier containing a specific amount of zinc oxide particles having a specific size, a hydrogenated oil in which the amount of potential total sediment is reduced can be obtained and thus the present invention has been completed.

That is, the present invention relates to a hydrogenation catalyst for heavy hydrocarbon oil, a production method for a hydrogenation catalyst for heavy hydrocarbon oil, and a hydrogenation method for heavy hydrocarbon oil described below.

[1] A hydrogenation catalyst for heavy hydrocarbon oil using, as a carrier, phosphorous-zinc-containing alumina that contains 0.1% by mass to 4% by mass, in terms of oxide based on the carrier, of phosphorous and 1% by mass to 12% by mass, based on the carrier, of zinc oxide particles, and supporting, on the carrier, 8% by mass to 20% by mass, in terms of oxide based on the catalyst, of at least one selected from metals in Group 6 of the periodic table and 2% by mass to 6% by mass, in terms of oxide based on the catalyst, of at least one selected from metals in Groups 8 to 10 of the periodic table, in which the average particle diameter of the zinc oxide particles is 2 μm to 12 μm.

[2] A production method for a hydrogenation catalyst for heavy hydrocarbon oil, including:
a step of preparing an alumina gel;
a step of kneading the alumina gel with a phosphorous compound and a zinc compound such that 0.1% by mass to 4% by mass, in terms of oxide based on a carrier, of phosphorous, and 1% by mass to 12% by mass, based on a carrier, of zinc oxide particles having an average particle diameter of 2 μm to 12 μm are incorporated;

a step of obtaining a phosphorous-zinc-containing alumina carrier by molding the obtained kneaded mixture, and drying and calcining a molded product; and a step of supporting, on the phosphorous-zinc-containing alumina carrier, at least one selected from metals in Group 6 of the periodic table and at least one selected from metals in Groups 8 to 10 of the periodic table such that 8% by mass to 20% by mass, in terms of oxide based on a catalyst, of at least one selected from metals in Group 6 of the periodic table and 2% by mass to 6% by mass, in terms of oxide based on a catalyst, of at least one selected from metals in Groups 8 to 10 of the periodic table are incorporated.

[3] A hydrogenation method for heavy hydrocarbon oil including conducting a catalytic reaction of heavy hydrocarbon oil in the presence of the hydrogenation catalyst for heavy hydrocarbon oil according to [1] above, under the conditions of a hydrogen partial pressure of 3 MPa to 20 MPa, a temperature of 300° C. to 420° C., and a liquid space velocity of $0.1\ h^{-1}$ to $3\ h^{-1}$.

Advantageous Effects of Invention

In the hydrogenation catalyst according to the present invention, a hydrogenation-active component is supported on a phosphorus-zinc-containing alumina carrier containing zinc oxide particles having a specific size together with phosphorus, and the desulfurization activity for heavy hydrocarbon oil is excellent. Further, by carrying out hydrogenation using the hydrogenation catalyst, a heavy hydrocarbon oil that does not easily produce sediment and has excellent storage stability can be obtained.

DESCRIPTION OF EMBODIMENTS

<Hydrogenation Catalyst>

The hydrogenation catalyst according to the present invention contains alumina as a carrier main component.

The alumina to be used may be any of various kinds of alumina including α-alumina, β-alumina, γ-alumina, and δ-alumina. However, an alumina which is porous and has a large specific surface area is preferable and among these various kinds of alumina, γ-alumina are suitable.

The purity of alumina suitably used as a carrier main component is preferably 98% by mass or higher and more preferably 99% by mass or higher.

Examples of impurities contained in alumina include $SO_4^{2-}$, $Cl^-$, $Fe_2O_3$, and $Na_2O$. The lower the content of these impurities, the more preferable the alumina is. The total amount of impurities is preferably 2% by mass or less and more preferably 1% by mass or less. The amount of each impurity is preferably as follows. The amount of $SO_4^{2-}$ is preferably 1.5% by mass or less, and the amount of $Cl^-$, $Fe_2O_3$, $Na_2O$ or the like is preferably 0.1% by mass or less.

The alumina used as a carrier of the hydrogenation catalyst according to the present invention may form a composite with one or more components selected from zeolite, boria, silica and zirconia and be used as a composite alumina carrier.

In the composite alumina carrier, the amount of alumina is 92% by mass to 99.9% by mass and preferably 95% by mass to 98% by mass, and the amount of one or more components selected from zeolite, boria, silica and zirconia is preferably 0% by mass to 8% by mass. At this time, the aforementioned zeolite, boria, silica and zirconia composite components can be generally used as a carrier component of this type of catalyst.

The carrier used in the hydrogenation catalyst according to the present invention is a phosphorus-zinc-containing alumina carrier obtained by further incorporating zinc and phosphorus into the alumina carrier (including the composite alumina carrier).

Zinc and phosphorus are added as components which improve the quality of active sites to improve desulfurization activity and residual carbon-removing activity per amount of active metals and have a function of accurately forming an active metal-sulfur phase having high activity such as a NiMoS phase or a NiWS phase.

The zinc content in the phosphorus-zinc-containing alumina carrier is 1% by mass to 12% by mass and preferably 2% by mass to 9% by mass in terms of oxide based on the carrier. Further, the zinc content is preferably 3% by mass to 6% by mass in terms of oxide based on the catalyst. When the zinc content is 1% by mass or more based on the carrier, the degree of sulfurization of metals in Group 6 of the periodic table can be sufficiently improved. When the zinc content is 12% by mass or less, a decrease in pore volume or specific surface area does not easily occur and metals in Group 6 of the periodic table are sufficiently dispersed and the degree of sulfurization of metals in Groups 8 to 10 of the periodic table does not easily decrease.

In the present invention, the term "metals in Group 6 of the periodic table" (hereinafter, also referred to as "Group 6 metals") refers to Group 6 metals in the long-periodic table and the term "metals in Groups 8 to 10 of the periodic table" (hereinafter, also referred to as "Group 8 to 10 metals") refers to Group 8 to 10 metals in the long-periodic table.

In the hydrogenation catalyst according to the present invention, zinc oxide particles having an average particle diameter of 2 μm to 12 μm, preferably 4 μm to 10 μm, and more preferably 5 μm to 9 μm, are used as zinc. When the average particle diameter of the zinc oxide particles contained in the carrier is 12 μm or less, a sufficient interaction with alumina is obtained and thus a hydrogenated heavy hydrocarbon oil having a sufficient storage stability can be obtained. On the other hand, when the average particle diameter of the zinc oxide particles contained in the carrier is 2 μm or more, zinc is easily mixed with alumina at the time of production of the phosphorus-zinc-containing alumina carrier.

In the present invention and the specification, the particle diameter of the zinc oxide particles is measured by a laser diffraction and scattering method according to JIS R1629 and the average particle diameter is set at the volume average of the particle size distribution. In addition, as the zinc oxide particles contained in the phosphorus-zinc-containing alumina carrier, a zinc oxide having a purity of 99% or higher is preferable.

The phosphorus content in the carrier of the hydrogenation catalyst according to the present invention is 0.1% by mass to 4% by mass and is preferably 0.5% by mass to 2.5% by mass in terms of oxide based on the carrier. In the hydrogenation catalyst according to the present invention, the phosphorus content is preferably 0.08% by mass to 3.6% by mass in terms of oxide based on the catalyst. When the phosphorus content in the carrier is 0.1% by mass or more in terms of oxide based on the carrier, the degree of sulfurization of the Group 6 metals is sufficiently increased. In addition, when the phosphorus content is 4% by mass or less, the Group 6 metals are sufficiently dispersed without causing a decrease in pore volume or specific surface area, and thus the effect of phosphorus addition can be obtained.

As a raw material compound for phosphorus contained in the carrier of the hydrogenation catalyst according to the present invention, various compounds can be used. Examples of phosphorus compounds include orthophosphoric acid, metaphosphoric acid, pyrophosphoric acid, triphosphates, and tetraphosphates. Among them, orthophosphoric acid is preferable.

In the present invention, regarding the zinc and phosphorus contents, the term "in terms of oxides based on the carrier" refers to a ratio of a zinc oxide mass and a phosphorus oxide mass to the total mass obtained by calculating the total mass of all elements included in the carrier in terms of respective oxides. The zinc oxide mass is obtained in terms of zinc oxide and the phosphorus oxide mass is obtained in terms of diphosphorus pentoxide, respectively.

It is considered that addition of zinc and phosphorus to the alumina carrier alleviates the interaction between the metals in Group 6 of the periodic table and the metals in Groups 8 to 10 of the periodic table and the carrier and makes the sulfurization of each of the Group 6 metals and the Group 8 to 10 metals easy. On the other hand, when the interaction between the Group 6 metals and the Group 8 to 10 metals and the carrier is too weak, aggregation of the active metals occurs and thus accurate control is required when zinc and phosphorus are added. In the hydrogenation catalyst according to the present invention, it is considered that a structural configuration such as the number of laminated layers can be optimized while maintaining a high dispersion state of an active metal-sulfur phase such as a NiMoS phase or a NiWS phase by adding zinc and phosphorus to the alumina carrier with accurate control.

In order to obtain the phosphorus-zinc-containing alumina carrier used in the hydrogenation catalyst according to the present invention, first, an alumina gel is prepared by a usual manner. The raw material for alumina to be used may be any material as long as the materials contain aluminum. Aluminum salts such as aluminum sulfate and aluminum nitrate are preferable. These raw materials for alumina are usually used as an aqueous solution. Although the concentration is not particularly limited, the concentration is preferably 2% by mass to 50% by mass and more preferably 5% by mass to 40% by mass.

For preparing the alumina gel, for example, an aqueous sulfuric acid solution, sodium aluminate, and aluminum hydroxide are mixed in a stirring pot to prepare a slurry. The obtained slurry is dewatered by a revolving cylinder type continuous vacuum filter and the slurry is washed with purified water to obtain an alumina gel. Next, the obtained alumina gel is washed until $SO_4^{2-}$ or $Na^+$ is not detected in the filtrate. Then, the alumina gel is mixed with purified water to obtain a homogeneous slurry. The obtained alumina gel slurry is dewatered until the water content reaches 60% by mass to 90% by mass and thus a cake is obtained.

In the production method for the hydrogenation catalyst according to the present invention, it is preferable that the dewatering of this alumina gel slurry be carried out by a pressure filtration apparatus. The dewatering carried out by a pressure filtration apparatus can improve the surface state of the alumina carrier and is advantageous in improving the level of degree of sulfurization of catalyst active metals (hydrogenation-active metals) which will be described later. The dewatering step using the pressure filtration apparatus is preferably carried out after at least one of a step of preparing an alumina gel and a step of kneading a phosphorus compound and zinc oxide particles, which will be described later, and may be carried out after both steps. More preferably, the dewatering step is carried out before the step of kneading a phosphorus compound and zinc oxide particles and after the step of preparing an alumina gel.

Here, the pressure filtration apparatus is a filter for filtering slurry by applying pressurized air or pump pressure to the slurry and is also generally called a filter press. Two types of pressure filtration apparatus are a plate and frame type and a recessed plate type. In the plate and frame type filter press, filter plates and filter frames are fastened alternately between end plates and slurry is filtered by press-injecting the slurry into the filter frame. The filter plate has a groove which is a filtrate passage and a furnace cloth is attached to a furnace frame. On the other hand, in the recessed plate type filter press, filter cloths and recessed plate type filter plates are arranged and fastened alternately between end plates to form filter chambers (reference literature: Chemical Engineers' Handbook p. 715).

In addition to the above method, as a method for preparing the alumina gel, a method of neutralizing an aqueous solution containing the raw material for alumina with a neutralizing agent such as a base such as ammonia, aluminic acid, sodium aluminate, or the like, a method of mixing an aqueous solution containing the raw material for alumina with a precipitating agent, such as hexamethylenetetramine, or calcium carbonate, and the like may be used.

Although not particularly limited, the amount of the neutralizing agent used is preferably 30% by mass to 70% by mass with respect to the total amount of the aqueous solution containing the raw material for alumina and the neutralizing agent. Although not particularly limited, the amount of the precipitating agent is preferably 30% by mass to 70% by mass with respect to the total amount of the aqueous solution containing the raw material for alumina and the precipitating agent.

When a composite alumina carrier obtained by combining alumina with a composite component such as zeolite is used as the alumina carrier, first, an alumina gel is prepared in a usual manner, and the obtained alumina gel undergoes aging, washing, dewatering drying, and water content adjustment. Then, the alumina is combined with the composite component by a coprecipitation method or a kneading method. The composite alumina gel undergoes aging, washing, dewatering drying, and water content adjustment. It is preferable that the composite alumina gel be also dewatered using the press filtration apparatus in the final dewatering step before molding.

Next, a phosphorus compound and zinc oxide particles are added to the obtained alumina gel while kneading. Specifically, an aqueous phosphorus compound solution heated to 15° C. to 90° C. and zinc oxide particles are added to the alumina gel with an adjusted water content, which has been heated to 50° C. to 90° C., and the resultant mixture is kneaded and stirred using a heated kneader or the like, thereby obtaining a kneaded mixture for a phosphorus-zinc-containing alumina carrier. As described above, dewatering with the pressure filtration apparatus may be carried out after the alumina gel, a phosphorus compound, and a zinc compound are kneaded and stirred.

Subsequently, the obtained kneaded mixture is molded, dried and calcined to obtain a zinc-containing alumina carrier. When the obtained kneaded mixture is molded, various molding methods such as extrusion and press molding can be carried out.

In addition, when the obtained molding is dried, the drying temperature is preferably 15° C. to 150° C. and particularly preferably 80° C. to 120° C., and the drying time is preferably 30 minutes or longer. When the obtained dried product is calcined, the calcination temperature can be appropriately set as required. For example, in order to obtain γ-alumina, calcination is carried out preferably at 450° C. or higher and more preferably 480° C. to 600° C. The calcination time is preferably 2 hours or longer and particularly preferably 3 hours to 12 hours.

It is preferable that the phosphorus-zinc-containing alumina carrier of the hydrogenation catalyst according to the present invention have the following physical property values.

The specific surface area of the phosphorus-zinc-containing alumina carrier is a value measured by a nitrogen adsorption method (BET method) and is preferably 200 m$^2$/g to 380 m$^2$/g and more preferably 220 m$^2$/g to 360 m$^2$/g. When the specific surface area is too small, the dispersibility of the hydrogen active metals is poor and desulfurization activity is likely to be low. When the specific surface area is too large, the pore diameter becomes extremely small and thus the pore diameter of the catalyst is also reduced. Thus, during hydrogenation, the sulfur compounds do not sufficiently diffuse into the pores of the catalyst and thus desulfurization activity is likely to be low. When the specific surface area of the phosphorus-zinc-containing alumina carrier is set to be within the above range, the dispersibility of the hydrogen active metals becomes satisfactory and a hydrogenation catalyst having a sufficiently large pore diameter can be obtained.

The average pore diameter of the phosphorus-zinc-containing alumina carrier measured by a mercury penetration method in the pore distribution is preferably 5 nm to 12 nm and more preferably 6 nm to 10 nm. When the average pore diameter of the phosphorus-zinc-containing alumina carrier is set to be within the above range, the dispersibility of a reactant into the pores becomes satisfactory while the carrier has a sufficient surface area in the pores, and the desulfurization reaction effectively proceeds. Thus, desulfurization activity is further improved.

The pore volume of the phosphorus-zinc-containing alumina carrier is a value measured by a mercury penetration method and is preferably 0.4 mL/g to 0.9 mL/g and more preferably 0.6 mL/g to 0.8 mL/g. In the case in which the pore volume is too small, when the catalyst is prepared in a usual impregnation method, the amount of the solvent infiltrating into the pore volume is small. When the amount of a solvent is small, the solubility of the hydrogenation-active metals becomes poor and the dispersibility of the metals decreases. Thus, a catalyst having a low activity is likely to be obtained. In order to raise the solubility of the hydrogenation-active metals, a method of adding a large amount of an acid such as nitric acid may be used. However, addition of an excessive amount of an acid decreases the surface area of the carrier and is a main factor of causing deterioration in desulfurization performance. On the other hand, when the pore volume is too large, the specific surface area becomes extremely small and thus the dispersibility of the active metals is likely to decrease. When the pore volume of the phosphorus-zinc-containing alumina carrier is set to be within the above range, the carrier has a sufficient specific surface area and the amount of the solvent infiltrating into the pore volume is sufficient, the solubility and dispersibility of the hydrogenation-active metals are satisfactory and desulfurization activity is further improved.

On the phosphorus-zinc-containing alumina carrier, at least one selected from the Group 6 metals and at least one selected from the Group 8 to 10 metals are supported such that 8% by mass to 20% by mass, in terms of oxide based on the catalyst, of at least one selected from the Group 6 metals and 2% by mass to 5 by mass, in terms of oxides based on the catalyst, of at least one selected from the Group 8 to 10 metals are incorporated. Thus, the hydrogenation catalyst according to the present invention can be produced.

Here, regarding the contents of the Group 6 metals and the Group 8 to 10 metals, the term "in terms of oxide based on the catalyst" refers to a ratio of an oxide mass to the total mass obtained by calculating the total mass of all elements included in the carrier as respective oxides. The oxide mass of the Group 6 metals and the Group 8 to 10 metals is obtained by converting the Group 6 metals to hexavalent oxides and the Group 8 to 10 metals to divalent oxides.

Examples of the Group 6 metals include molybdenum (Mo), tungsten (W), chromium (Cr), and among them, Mo exhibiting a high activity per unit mass is preferable. Examples of Mo supported on the phosphorus-zinc-containing alumina carrier include molybdenum trioxide, molybdophosphoric acid, ammonium molybdate, molybdic acid and the like. Molybdophosphoric acid, molybdenum trioxide, and ammonium molybdate are preferable.

The Group 6 metal content in the phosphorus-zinc-containing alumina carrier is preferably 8% by mass to 20% by mass and more preferably 10% by mass to 16% by mass in terms of oxide based on the catalyst. When the Group 6 metal content is 8% by mass or more, the effect of the addition of the Group 6 metals can be sufficiently exhibited. When the Group 6 metal content is 20% by mass or less, aggregation of the Group 6 metals does not easily occur and the dispersibility of the active metals is improved. That is, catalyst activity can be improved without exceeding the limit of the active metal content in which the active metals are effectively dispersed or causing a significant decrease in the catalyst surface area.

Examples of the Group 8 to 10 metals include nickel (Ni) and cobalt (Co), and among them, Ni high in hydrogenation performance and low in catalyst preparation cost is preferable. Examples of Ni compounds supported on the phosphorus-zinc-containing alumina carrier include a carbonate, an acetate, a nitrate, a sulfate, and a chloride of Ni, a carbonate and an acetate are preferable and a carbonate is more preferable.

The Group 8 to 10 metal content in the phosphorus-zinc-containing alumina carrier is 2% by mass to 6% by mass and preferably 2.5% by mass to 4.5% by mass in terms of oxide based on the catalyst. When the Group 8 to 10 metal content is 2% by mass or more, sufficient active sites belonging to the Group 8 to 10 metals are obtained. On the other hand, when the Group 8 to 10 metal content is 6% by mass or less, aggregation of the Group 8 to 10 metals does not easily occur and the dispersibility of the active metals is improved. For example, in a case of using Ni, a NiO species (which is present as a NiS species after catalyst sulfurization or during hydrogenation) as an inactive precursor or a Ni spinel species enclosed in the lattice of the carrier is not easily formed and thus catalyst activity is improved.

In the content of each component of the Group 6 metals and the Group 8 to 10 metals, the optimal mass ratio between the Group 6 metals and the Group 8 to 10 metals, which are hydrogenation-active metals, is a value of [Group 8 to 10 metal oxide mass]/([Group 8 to 10 metal oxide mass]+[Group 6 metal oxide mass]) and is preferably 0.14 to 0.3.

When the mass ratio of the Group 8 to 10 metals to the total amount of the Group 6 metals and the Group 8 to 10 metals is too low, an active metal-sulfur phase such as a NiMoS phase or a NiWS phase, which can be thought of as active sites for desulfurization, cannot be sufficiently formed and desulfurization activity is unlikely to be improved. When the mass ratio of the Group 8 to 10 metals is too high, an unnecessary metal species (such as a NiS species or a Ni spinel species enclosed in the lattice of the carrier) not contributing to activity is formed and thus catalyst activity is likely to decrease. When the mass ratio of the Group 8 to 10 metal is set to be within the above range, an active metal-sulfur phase is sufficiently formed and an unnecessary metal species not contributing to activity can be inhibited from being formed.

As a method for supporting the Group 6 metals and the Group 8 to 10 metals on the phosphorus-zinc-containing alumina carrier, a known method such as an impregnation method or a coprecipitation method may be used. For example, like a method in which in a state in which the phosphorus-zinc-containing alumina carrier is immersed in a solution containing these hydrogenation-active metal components, the hydrogenation-active metal components are precipitated, an impregnation method in which the phosphorus-zinc-containing alumina carrier is brought into contact with a solution containing the hydrogenation-active metal components and the hydrogenation-active metals are supported on the phosphorus-zinc-containing alumina carrier can be adopted. As a method for impregnating the phosphorus-zinc-containing alumina carrier with the Group 6 metals and the Group 8 to 10 metals, a one-step impregnation method performed by simultaneous impregnation of the respective components or a two-step impregnation method performed by individual impregnation of the respective components may be used.

As a specific method for supporting the Group 6 metals and the Group 8 to 10 metals on the phosphorus-zinc-containing alumina carrier, the following method can be used. First, a solution for immersion including a Group 6 metal compound, a Group 8 to 10 metal compound, and a phosphorus compound is prepared. When the metal compounds contain phosphorus, a phosphorus compound is not added or an appropriate amount of a phosphorus compound is added. During the preparation, to accelerate the dissolution of these compounds, heating may be carried out (30° C. to 100° C.) or an acid (such as nitric acid, phosphoric acid, or organic acid (such as citric acid, acetic acid, malic acid, or tartaric acid) may be added.

Here, the mass ratio of phosphorus to be kneaded into the carrier with respect to the Group 6 metals in terms of oxide is preferably 0.25 or less. When the mass ratio of phosphorus is 0.25 or less, the surface area and pore volume of the catalyst do not decrease and hence the activity of the catalyst does not decrease as well as acid amount does not increasing and carbon precipitation can be prevented. Thus, activity deterioration is suppressed.

Subsequently, the prepared phosphorus-zinc-containing alumina carrier is impregnated with the prepared solution for immersion by gradually adding the solution to the phosphorus-zinc-containing alumina carrier so as to become homogeneous. The impregnation time is preferably 1 minute to 5 hours and more preferably 5 minutes to 3 hours, and the temperature is preferably 5° C. to 100° C. and more preferably 10° C. to 80° C. Although the atmosphere is not particularly limited, any atmosphere of air, a nitrogen stream and a vacuum is suitable for impregnation.

After the Group 6 metal and Group 8 to 10 metal components are supported on the carrier and the carrier is impregnated with the metal components, generally, the water in the carrier is removed to some degree (to LOI (Loss on ignition) of 50% or lower) at a temperature of room temperature to 80° C. in air or a nitrogen stream or under a vacuum. Then, drying is conducted in a drying furnace in an air stream at a temperature of 80° C. to 150° C. for 10 minutes to 10 hours. Next, calcination is carried out in a calcination furnace in an air stream at a temperature of preferably 300° C. to 700° C., more preferably 500° C. to 650° C., for preferably 10 minutes to 10 hours, more preferably 3 hours or longer.

It is preferable that the specific surface area, pore volume, average pore diameter, and pore distribution of the hydrogenation catalyst according to the present invention be adjusted to be within the following ranges in order to enhance hydrogenation activity and desulfurization activity with respect to heavy hydrocarbon oil.

The specific surface area of the hydrogenation catalyst according to the present invention is a value measured by a BET method and is preferably 180 $m^2/g$ to 320 $m^2/g$ and more preferably 200 $m^2/g$ to 300 $m^2/g$. When the specific surface area is too small, the dispersibility of the hydrogenation-active metals becomes poor and when the specific surface area is too large, the pore diameter becomes extremely small and thus, the pore diameter of the catalyst also becomes small. When the specific surface area of the hydrogenation catalyst according to the present invention is set to be within the above range, the dispersibility of the hydrogenation-active metals and the diffusibility of sulfur compounds into the pores of the catalyst during hydrogenation can be further improved.

The pore volume of the hydrogenation catalyst according to the present invention is a value measured by a mercury penetration method and is preferably 0.45 mL/g to 0.8 mL/g and more preferably 0.5 mL/g to 0.7 mL/g. When the pore volume is too small, insufficient diffusibility of sulfur compounds into the pores of the catalyst during hydrogenation is likely to be obtained. When the pore volume is too large, the specific surface area is likely to become extremely small. When the pore volume of the hydrogenation catalyst according to the present invention is set to be within the above range, the dispersibility of the hydrogenation-active metals and the diffusibility of sulfur compounds into the pores of the catalyst during hydrogenation can be further improved.

The average pore diameter of the hydrogenation catalyst according to the present invention measured by a mercury penetration method in the pore distribution is preferably 7 nm to 13 nm and more preferably 7 nm to 12 nm. When the average pore diameter of the hydrogenation catalyst according to the present invention is set to be within the above range, the dispersibility of a reactant into the pores becomes satisfactory while the carrier has a sufficient surface area in the pores (that is, an effective specific surface area of the catalyst), and thus desulfurization activity can be further improved.

In addition, in order to increase the effective number of pores satisfying the pore conditions, the hydrogenation catalyst according to the present invention has a pore distribution in which the ratio of the total volume of pores having a pore diameter of the average pore diameter ±1.5 nm to the total pore volume is preferably 45% or more and more preferably 55% or more.

Further, the state of distribution of the hydrogenation-active metals in the hydrogenation catalyst according to the present invention is preferably of a uniform type in which the active metals are homogeneously distributed in the catalyst.

<Hydrogenation Method>

The hydrogenation method according to the present invention includes conducting hydrogenation by bringing feedstock oil into contact with the hydrogenation catalyst according to the present invention under the conditions of a hydrogen partial pressure of 3 MPa to 20 MPa, preferably 8

MPa to 19 MPa, a temperature of 300° C. to 420° C., preferably 350° C. to 410° C., and a liquid space velocity (LHSV) of 0.1 h$^{-1}$ to 3 h$^{-1}$, preferably 0.15 h$^{-1}$ to 2 h$^{-1}$ to reduce a sulfur content in the feedstock oil.

When the temperature is 300° C. or higher, catalyst activity, particularly, demetallization activity can be sufficiently exhibited. Meanwhile, when the temperature is 420° C. or lower, thermal cracking of the heavy hydrocarbon oil suitably proceeds and catalyst deterioration does not easily occur.

When the hydrogen partial pressure is 8 MPa or higher, the hydrogenation reaction proceeds easily and when the hydrogen partial pressure is 20 MPa or lower, a suitable degree of demetallization activity is obtained and thus catalyst life is extended.

Examples of the heavy hydrocarbon oils used in the hydrogenation method according to the present invention include visbreaking oil which includes atmospheric distillation residual oil, vacuum distillation residual oil, and thermally cracked oil, each obtained from crude oil, tar sand oil and shale oil which are heavy hydrocarbon oils other than petroleum, and mixtures thereof. Atmospheric distillation residual oil, vacuum distillation residual oil, or a mixture thereof is preferable.

In the case of mixing atmospheric distillation residual oil and vacuum distillation residual oil, although the mixing ratio varies depending on the properties thereof, the oils are mixed such that the mixing ratio of the vacuum distillation residual oil is about 1% by volume to 60% by volume in most cases.

As the heavy hydrocarbon oil used in the hydrogenation method according to the present invention, a heavy hydrocarbon oil having a density of 0.91 g/cm$^3$ to 1.10 g/cm$^3$, particularly 0.95 g/cm$^3$ to 1.05 g/cm$^3$, 2% by mass to 6% by mass, particularly 2% by mass to 5% by mass, of sulfur, 1 ppm to 1,500 ppm, particularly 20 ppm to 400 ppm, of metals such as nickel and vanadium, and 2% by mass to 15% by mass, particularly 3% by mass to 10% by mass, of asphaltene is preferable.

The hydrogenation conditions in the hydrogenation method according to the present invention may be appropriately selected according to a required degree of reaction. For example, a hydrogen/oil ratio is preferably 400 m$^3$/m$^3$ to 3,000 m$^3$/m$^3$ and more preferably 500 m$^3$/m$^3$ to 1,800 m$^3$/m$^3$.

The hydrogenation catalyst according to the present invention is generally activated by sulfurization in a reactor before being used (that is, before the hydrogenation method according to the present invention is carried out). The sulfurization is generally conducted using a sulfur compound-containing petroleum distillate and a compound obtained by adding thereto a sulfiding agent such as a dimethyl disulfide or carbon disulfide, or using hydrogen sulfide at a temperature of 200° C. to 400° C., preferably 250° C. to 350° C., under a hydrogen atmosphere having normal pressure or a hydrogen partial pressure higher than normal pressure.

In the case in which the hydrogenation method according to the present invention is carried out on a commercial scale, the hydrogenation method may be conducted by forming a catalyst layer of the hydrogenation catalyst according to the present invention in a reactor, introducing feedstock oil into the reactor, and allowing a hydrogenation reaction to proceed under the conditions described above.

The catalyst layer may be a fixed bed, moving bed, or fluidized bed type catalyst. In the most common case, a fixed bed catalyst layer is formed in a reactor and feedstock oil is introduced into an upper part of the reactor and passed through the fixed bed from the upper to the lower side thereof. The product oil is discharged from a lower part of the reactor.

The hydrogenation method according to the present invention may be a single stage hydrogenation method in which feedstock oil is treated with a single reactor packed with the hydrogenation catalyst according to the present invention or may be a multi-stage successive hydrogenation method in which several reactors packed with the catalyst are used.

EXAMPLES

Next, embodiments and effects of the present invention will be described more specifically by way of examples and the like, but the present invention is not construed as being limited by these examples.

The average particle diameters of the zinc oxide particles used in Examples and Comparative Examples are shown in Table 1. The particle diameter of the zinc oxide particles was measured by the laser diffraction and scattering method according to JIS R1629 and the average particle diameter was set at the volume average of the particle size distribution.

TABLE 1

|  | Average particle diameter (μm) |
| --- | --- |
| Zinc oxide 1 | 5.5 |
| Zinc oxide 2 | 7.1 |
| Zinc oxide 3 | 0.5 |
| Zinc oxide 4 | 15.0 |

Example 1

Preparation of Hydrogenation Catalyst A

First, a phosphorus-zinc-containing alumina carrier was prepared. 1.5 L of a 12% by mass sulfuric acid solution was poured into 100 L of purified water in a stirring pot and the resulting mixture was heated to 95° C. and then vigorously stirred with a stirring blade for 5 minutes. Then, 3.9 L of sodium aluminate having an alumina concentration of 70 g/L was poured into the stirring pot and aluminum hydroxide was prepared and stirred with a stirring blade for 24 hours. The obtained slurry was charged into a filter and filtered so as to remove water. Then, the obtained gel was washed with purified water until SO$_4^{2-}$ or Na$^+$ was not detected in the filtrate. Next, the washed gel was mixed with purified water to obtain a homogeneous slurry. The slurry was charged into a pressure filtration apparatus. The slurry was interposed between filter plates via a filter cloth and the filer plates were compressed to conduct dewatering.

When the water content in the obtained cake reached 80%, the filtration was stopped. The cake was put into a heating type kneader (setting temperature: 80° C.) and sufficiently kneaded so as to become homogeneous. Then, phosphoric acid and Zinc oxide 1 as zinc oxide particles were added to the kneaded mixture and the mixture was further kneaded so as to become homogeneous. The cake obtained by kneading was extruded and charged into a molding device so as to form a molded product extruded into a four-leaf shape having a major diameter of 1.3 mm and a minor diameter of 1.1 nm. The molded product was dried and calcined at 600° C. for 4 hours to obtain a phosphorus-zinc-containing alumina carrier. In the obtained phosphorus-zinc-containing alumina carrier, the phosphorus content was 1.2% by mass in terms of oxide based on the carrier, the zinc content was 4.0% by mass in terms of oxide based on the carrier, the pore volume was 0.73 mL/g, the specific surface area was 307 m²/g, and the average pore diameter was 7.7 nm.

50.00 g of the phosphorus-zinc-containing alumina carrier (a γ-Al$_2$O$_3$-based molded product having a four-leaf shape with a diameter of 1.33 mm×1.10 mm) was put into an eggplant-shaped flask. A solution obtained by dissolving 8.76 g of ammonium molybdate in 37.6 g of ion-exchanged water was added dropwise to the phosphorus-zinc-containing alumina carrier, and the resulting mixture was then left to stand. Then, the resulting product was dried and then calcined at 500° C. for 4 hours to obtain a molybdenum-supporting phosphorus-zinc-containing alumina carrier. Next, a solution obtained by dissolving 9.27 g of nickel nitrate in 31.8 g of ion-exchanged water was added dropwise to the molybdenum-supporting phosphorus-zinc-containing alumina carrier and the resulting mixture left to stand. Then, the resulting product was dried and then calcined at 650° C. for 4 hours to obtain Catalyst A.

Example 2

Preparation of Hydrogenation Catalyst B

Hydrogenation catalyst B was prepared in the same manner as in Example 1 except that Zinc oxide 1 was changed to Zinc oxide 2.

Comparative Example 1

Preparation of Hydrogenation Catalyst A

Hydrogenation catalyst a was prepared in the same manner as in Example 1 except that Zinc oxide 1 was changed to Zinc oxide 3.

Comparative Example 2

Preparation of Hydrogenation Catalyst B

Hydrogenation catalyst b was prepared in the same manner as in Example 1 except that Zinc oxide 1 was changed to Zinc oxide 4.

<Physical Properties and Chemical Properties of Carrier and Catalyst>

The properties of the carriers of Hydrogenation catalysts A, B, a, and b [the amounts of phosphorus and zinc supported (in terms of oxides based on the carrier), the average pore diameter, and the pore volume] prepared in Examples 1 and 2, and Comparative Examples 1 and 2 are shown in Table 2.

The properties of Hydrogenation catalysts A, B, a, and b [the amounts of Mo and Ni supported (in terms of oxides based on the catalyst), the amounts of phosphorus and zinc supported (in terms of oxides based on the catalyst), the average pore diameter, the specific surface area, the pore volume, and the pore distribution] prepared in Examples 1 and 2, and Comparative Examples 1 and 2 are shown in Table 3.

In Table 3, "Ni/Mo (upper row) 4/12 (lower row)" in the column "active metals/amount of active metals (% by mass)" means that the catalyst contains 4% by mass of Ni and 12% by mass of Mo in terms of respective oxides based on the catalyst.

In addition, in Table 3, the column "pore distribution" refers to a ratio of the total volume of pores having a diameter of the average pore diameter ±1.5 nm to the total pore volume. The physical properties and chemical properties of the catalysts were measured in the following procedures.

[1] Determination of Physical Properties (Specific Surface Area, Pore Volume, Average Pore Diameter, and Pore Distribution)

a) Measurement Method and Apparatus Used:

The specific surface area was measured by nitrogen adsorption according to the BET method. As the nitrogen adsorption apparatus, a surface area-measuring apparatus (Belsorp-mini) manufactured by BEL Japan, Inc. was used.

The pore volume, average pore diameter, and pore distribution were measured by a mercury penetration method. As the mercury penetration apparatus, a porosimeter (MICROMERITICS AUTO-PORE 9200, manufactured by Shimadzu Corporation) was used.

b) Measurement Principle:

The mercury penetration method is based on the capillary phenomenon. In the case of mercury and cylindrical pores, the law is expressed by the following equation. In the equation, D represents a pore diameter, P represents an applied pressure, γ represents a surface tension, and θ represents a contact angle. The volume of the mercury caused to penetrate into the pores was measured as a function of the applied pressure P. The surface tension of the mercury in the pores of the catalyst was set to 484 dyne/cm and the contact angle was set to 130 degrees.

Equation: $D=-(1/P)4\gamma \cos \theta$

The pore volume is a total mercury volume amount per gram of catalyst having infiltrated into the pores. The average pore diameter is an average value of D calculated as a function of P.

The pore distribution is a distribution of D calculated as a function of P.

c) Measurement Procedures:

1) The power of a vacuum heating degassing apparatus was turned on and it was confirmed that the temperature was set to 400° C. and the degree of vacuum was set to 5×10$^{-2}$ Torr or less.

2) An empty sample burette was attached to the vacuum heating degassing apparatus.

3) When the degree of vacuum reached 5×10$^{-2}$ Torr or less, the sample burette was closed using the cock and detached from the vacuum heating degassing apparatus, followed by being cooled to allow the weight to be measured.

4) A sample (carrier or catalyst) was put into the sample burette.

5) The sample burette into which the sample was put was attached to the vacuum heating degassing apparatus and was left for 1 hour or longer from when the degree of vacuum reached 5×10$^{-2}$ Torr or less.

6) The sample burette into which the sample was put was detached from the vacuum heating degassing apparatus and cooled and the weight was measured to obtain the weight of the sample.

7) The sample was put in a cell for the AUTO-PORE 9200.

8) Measurement was carried out by the AUTO-PORE 9200.

[2] Determination of Chemical Properties a) Determination Method and Used Apparatus:

Metal analysis of the carrier and the catalyst was carried out using an inductively coupled plasma emission spectrometer (ICPS-2000, manufactured by Shimadzu Corporation).

Metal quantitation was carried out by an absolute calibration curve method.

b) Measurement Procedures:

1) 0.05 g of a sample, 1 mL of hydrochloric acid (50% by mass), a drop of hydrofluoric acid, and 1 mL of purified water were charged into a uniseal, followed by heating for decomposition.

2) After the decomposition, the obtained solution was moved to a measuring flask made of polypropylene (having a volume of 50 mL), purified water was added to the flask, and 50 mL of the solution was weighed.

3) The measurement for the solution was carried out using the ICPS-2000.

TABLE 2

| | Example 1 | Example 2 | Comparative Example 1 | Comparative Example 2 |
|---|---|---|---|---|
| Type of catalyst | Catalyst A | Catalyst B | Catalyst a | Catalyst b |
| Zinc oxide | Zinc Oxide 1 | Zinc Oxide 2 | Zinc Oxide 3 | Zinc Oxide 4 |
| $P_2O_5$ (% by mass) | 1.2 | 1.1 | 1.2 | 1.3 |
| ZnO (% by mass) | 4.0 | 4.0 | 4.0 | 4.1 |
| Average pore diameter (nm) | 7.7 | 7.8 | 7.8 | 7.8 |
| Specific surface area ($m^2/g$) | 307 | 311 | 312 | 314 |
| Pore volume (mL/g) | 0.73 | 0.72 | 0.72 | 0.73 |

TABLE 3

| | Example 1 | Example 2 | Comparative Example 1 | Comparative Example 2 |
|---|---|---|---|---|
| Type of catalyst | Catalyst A | Catalyst B | Catalyst a | Catalyst b |
| Zinc oxide | Zinc oxide 1 | Zinc oxide 2 | Zinc oxide 3 | Zinc oxide 4 |
| Active metals | Ni/Mo | Ni/Mo | Ni/Mo | Ni/Mo |
| Amount of active metals (% by mass) | 4/12 | 4/12 | 4/12 | 4/12 |
| $P_2O_5$ (% by mass) | 1.0 | 0.9 | 1.0 | 1.1 |
| ZnO (% by mass) | 3.6 | 3.6 | 3.6 | 3.7 |
| Average pore diameter (nm) | 8.6 | 8.7 | 8.8 | 8.8 |
| Specific surface area ($m^2/g$) | 262 | 267 | 130 | 270 |
| Pore volume (mL/g) | 0.61 | 0.6 | 0.6 | 0.74 |
| Pore distribution (%) | 0.75 | 0.74 | 0.73 | 0.74 |

<Hydrogenation Reaction of Heavy Hydrocarbon Oil>

Hydrogenation for atmospheric distillation residual oil (AR) having the following properties was carried out by the following procedures. As the hydrogenation catalysts, Catalysts A, B, a, and b prepared in Examples 1 and 2, and Comparative Examples 1 and 2 were respectively used.

First, the hydrogenation catalyst was charged into a high-pressure flow type reactor to form a fixed bed type catalyst layer, and then a pre-treatment was carried out under the following conditions. Next, a fluid mixture of a feedstock oil heated to the reaction temperature and a hydrogen-containing gas was introduced from the upper part of the reactor. A desulfurization reaction and a hydrogenation reaction, which is a decomposition reaction, were carried out under the following conditions to produce an oil. A fluid mixture of the product oil and gas was allowed to flow out from the lower part of the reactor and the product oil was separated out by a gas-liquid separator.

The measurement methods were such that the density was measured according to JIS K 2249-1 "Crude petroleum and petroleum products-Determination of density and petroleum measurement tables (oscillation type density testing method)", the sulfur content was measured according to JIS K 2541-4 "Crude oil and petroleum products-Determination of sulfur content, Part 4: Energy-dispersive X-ray fluorescence method", and the potential total sediment content was measured according to JPI-5S-60-2000. Specifically, the potential total sediment content was determined in the following manner.

<Measurement Procedure of Potential Total Sediment Content>

1) 25 g of a sample heated to 60° C. was collected and put into an Erlenmeyer flask, an air condenser was attached to the flask, and the flask was put in an oil bath at 100° C. and left for 24 hours.

2) The sample was sufficiently oscillated and then 10.5 g of the sample was sampled and put into a glass beaker.

3) The glass beaker into which the sample was put was heated at 100° C. for 10 minutes.

4) The sample was charged into a vacuum filter in which 3 sheets of dried glass fiber filter paper (having a diameter of 47 mm and a pore diameter of 1.6 μm) were set in a laminated manner and the pressure was reduced to 80 kPa with a vacuum pump and the pressure was reduced to 40 kPa after 30 seconds.

5) After the filtration was completed and the filter paper surface was dried, the pressure was further reduced continuously for 5 minutes.

6) After the vacuum pump was stopped, the funnel and the entire filter were washed with 25 mL of a cleaning solvent (heptane 85 mL+toluene 15 mL) while drawing up the filter with an aspirator.

7) After the filter paper was further washed with 20 mL of heptane, the uppermost filter paper (the first sheet from the top) was removed and the filter paper underneath was washed with 20 mL of heptane.

8) The first and second filter paper from the top were dried at 110° C. for 20 minutes and then allowed to cool for 30 minutes.

9) The amount of an increase in the weight of the first and second filter paper obtained by comparing the weight after filtration and the weight before filtration was measured, the weight obtained by subtracting the increased weight of the second filter paper from the increased weight of the first filter paper with respect to the weight of the collected sample was expressed as a percentage, and the value was set to the potential total sediment (% by mass).

When the filtration was not finished in 25 minutes, the amount of the sample was reduced to 5 g or 2 g and the measurement was carried out again.

The nickel and vanadium contents were measured according to the Japan Petroleum Institute standard JPI-5S-62-

2000 "Petroleum products-Determination of metal content (ICP emission spectrometry)".

For asphaltene, toluene was added to the sample and the mixture was then filtered with a cellulose filter to recover toluene-insoluble components. These insoluble components were considered as asphaltene.

For resins, toluene was added to the sample and then the mixture was filtered with a cellulose filter. Then, the toluene soluble components as a filtrate were concentrated. A heptane solution obtained by adding heptane to the concentrate was made to flow through an active alumina-charged column and separated into saturates, aromatics, and resins to recover the resins.

Pre-treatment conditions for catalyst:
Preliminary sulfurization of the catalyst was carried out with a vacuum gas oil at a hydrogen partial pressure of 10.3 MPa and 370° C. for 12 hours. Then, the gas oil was changed to a feedstock oil for activity evaluation.

Reaction Conditions
Reaction temperature: 385° C.
Pressure (hydrogen partial pressure): 10.3 MPa
Liquid space velocity: 0.4 $h^{-1}$
Hydrogen/oil ratio: 1,690 $m^3/m^3$
Properties of Feedstock oil
Type of oil: atmospheric distillate residual oil of Middle East type crude oil
  Density (at 15° C.): 0.9759 $g/cm^3$
  Sulfur component: 3.51% by mass
  Vanadium: 59 ppm
  Nickel: 11 ppm
  Asphaltene content: 2.8% by mass The catalytic activity was determined in the following manner. The reactor was operated at 385° C. and an oil produced after 25 days had passed from when the operation started was collected. Thus, the properties (degree of desulfurization (HDS) (%), desulfurization reaction rate constant (Ks), desulfurization specific activity (%), and degree of demetallization (HDM)) of the oil were determined. The results are shown in Table 4.

[1] Degree of desulfurization (HDS) (%): The proportion of sulfur content which has disappeared from the feedstock oil through conversion of sulfur content in the feedstock into hydrogen sulfide by desulfurization reaction is defined as the degree of desulfurization. The degree of desulfurization was calculated from the analytical values of sulfur content for the feedstock oil and product oil using Equation (1) below.

[2] Desulfurization reaction rate constant (Ks): The constant of a reaction rate equation which gives a second order reaction with respect to a decrease in sulfur content of the product oil (Sp) is defined as the desulfurization reaction rate constant (Ks). The desulfurization reaction rate constant was calculated by Equation (2) below. Also, the higher the reaction rate constant is, the more excellent the catalytic activity is.

[3] Desulfurization specific activity (%): The desulfurization specific activity is expressed as a relative value when the desulfurization reaction rate constant of Catalyst A is 100. The desulfurization specific activity was calculated by Equation (3) below.

[4] Degree of demetallization (HDM) (%): The proportion of metal content (total amount of nickel and vanadium) which has disappeared from the feedstock oil is defined as the degree of demetallization and the degree of desulfurization was calculated from the analytical values of metal content for the feedstock oil and product oil using Equation (4) below.

$$\text{Degree of desulfurization (\%)} = [(Sf-Sp)/Sf] \times 100 \quad (1)$$

$$\text{Desulfurization reaction rate constant} = [1/Sp - 1/Sf] \times (LHSV) \quad (2)$$

In the formulae, Sf: sulfur content in feedstock oil (% by mass),
Sp: sulfur content in product oil (% by mass), and
LHSV: liquid space velocity (1l').

$$\text{Desulfurization specific activity (\%)} = (\text{desulfurization reaction rate constant of each catalyst/desulfurization reaction rate constant of Catalyst } A) \times 100 \quad (3)$$

$$\text{Degree of demetallization (\%)} = [(Mf-Mp)/Mf] \times 100 \quad (4)$$

In the formulae, Mf: total amount of nickel and vanadium in feedstock oil (ppm by mass), and
Mp: total amount of nickel and vanadium in product oil (ppm by mass).

[Analysis on Product Oil]

The results of the desulfurization specific activity, degree of demetallization, resin content, asphaltene content, ratio of asphaltene content to resin content (mass ratio, [asphaltene content (% by mass)]/[resin content (% by mass)]), and potential total sediment content obtained from a product oil produced from the hydrogenation reaction on the 25th operation day are shown in Table 4.

TABLE 4

| Example | Example 1 | Example 2 | Comparative Example 1 | Comparative Example 2 |
|---|---|---|---|---|
| Type of catalyst | Catalyst A | Catalyst B | Catalyst a | Catalyst b |
| Desulfurization activity (Catalyst A = 100) | 100 | 99 | 97 | 99 |
| Degree of demetallization (%) | 73 | 74 | 75 | 75 |
| Resin content (% by mass) | 3.6 | 3.7 | 3.1 | 3.2 |
| Asphaltene content (% by mass) | 2.0 | 2.0 | 1.9 | 2.0 |
| Asphaltene content/resin content (mass ratio) | 0.56 | 0.54 | 0.61 | 0.63 |
| Potential total sediment (% by mass) | 0.5 | 0.5 | 0.9 | 1.0 |

The result was that in all the catalysts, the desulfurization specific activity and the degree of demetallization were almost the same. On the other hand, regarding the resin content and the amount of potential total sediment in the product oil, in the case of using Catalyst A or Catalyst B, the resin content was large and the amount of potential total sediment was clearly small compared to the case of using Catalyst a or b. That is, in a product oil obtained using Catalyst A or Catalyst B, a lower amount of sediment was formed and the storage stability was excellent compared to a product oil obtained using Catalyst a or Catalyst b.

From these results, it was found that by using the hydrogenation catalyst using zinc oxide particles having a particle size in a specific range which are contained in the phosphorus-zinc-containing carrier, without reducing the desulfurization activity of the hydrogenation catalyst, the potential total sediment content in the hydrogenated heavy hydrocarbon oil can be reduced and the storage stability can be enhanced.

INDUSTRIAL APPLICABILITY

According to the hydrogenation catalyst, the production method for the hydrogenation catalyst, and the hydrogenation method for heavy hydrocarbon oil using the hydrogenation catalyst of the present invention, the storage stability of a hydrogenated heavy hydrocarbon oil can be improved without reducing desulfurization activity or demetallization activity.

The invention claimed is:

1. A hydrogenation catalyst for heavy hydrocarbon oil using as a carrier phosphorous-zinc-containing alumina that contains 0.1% by mass to 4% by mass, in terms of oxide based on the carrier, of phosphorous and 1% by mass to 12% by mass, based on the carrier, of zinc oxide particles, and supporting, on the carrier, 8% by mass to 20% by mass, in terms of oxide based on the catalyst, of at least one selected from metals in Group 6 of the periodic table and 2% by mass to 6% by mass, in terms of oxide based on the catalyst, of at least one selected from metals in Groups 8 to 10 of the periodic table, wherein the average particle diameter of the zinc oxide particles is 2 μm to 12 μm.

2. A hydrogenation method for heavy hydrocarbon oil, comprising:

conducting a catalytic reaction of heavy hydrocarbon oil in the presence of the hydrogenation catalyst for heavy hydrocarbon oil according to claim 1, under the conditions of a hydrogen partial pressure of 3 MPa to 20 MPa, a temperature of 300° C. to 420° C., and a liquid space velocity of $0.1 h^{-1}$ to $3 h^{-1}$.

3. A hydrogenation catalyst for heavy hydrocarbon oil according to claim 1, wherein the specific surface area of the hydrogenation catalyst is 200 $m^2/g$ to 300 $m^2/g$.

4. A hydrogenation method for heavy hydrocarbon oil, comprising:

conducting a catalytic reaction of heavy hydrocarbon oil in the presence of the hydrogenation catalyst for heavy hydrocarbon oil according to claim 3, under the conditions of a hydrogen partial pressure of 3 MPa to 20 MPa, a temperature of 300° C. to 420° C., and a liquid space velocity of $0.1^{-1}$ to $3^{-1}$.

5. A production method for a hydrogenation catalyst for heavy hydrocarbon oil, comprising:

a step of preparing an alumina gel;

a step of kneading the alumina gel with a phosphorous compound and a zinc compound such that 0.1% by mass to 4% by mass, in terms of oxide based on a carrier, of phosphorous, and 1% by mass to 12% by mass, based on a carrier, of zinc oxide particles having an average particle diameter of 2 μm to 12 μm are incorporated;

a step of obtaining a phosphorous-zinc-containing alumina carrier by molding the obtained kneaded mixture, and drying and calcining a molded product; and a step of supporting, on the phosphorous-zinc-containing alumina carrier, at least one selected from metals in Group 6 of the periodic table and at least one selected from metals in Groups 8 to 10 of the periodic table such that 8% by mass to 20% by mass, in terms of oxide based on a catalyst, of at least one selected from metals in Group 6 of the periodic table and 2% by mass to 6% by mass, in terms of oxide based on a catalyst, of at least one selected from metals in Groups 8 to 10 of the periodic table are incorporated.

6. A production method for a hydrogenation catalyst for heavy hydrocarbon oil, comprising:

a step of preparing an alumina gel;

a step of kneading the alumina gel with a phosphorous compound and a zinc compound such that 0.1% by mass to 4% by mass, in terms of oxide based on a carrier, of phosphorous, and 1% by mass to 12% by mass, based on a carrier, of zinc oxide particles having an average particle diameter of 2 μm to 12 μm are incorporated;

a step of obtaining a phosphorous-zinc-containing alumina carrier by molding the obtained kneaded mixture, and drying and calcining a molded product; and a step of supporting, on the phosphorous-zinc-containing alumina carrier, at least one selected from metals in Group 6 of the periodic table and at least one selected from metals in Groups 8 to 10 of the periodic table such that 8% by mass to 20% by mass, in terms of oxide based on a catalyst, of at least one selected from metals in Group 6 of the periodic table and 2% by mass to 6% by mass, in terms of oxide based on a catalyst, of at least one selected from metals in Groups 8 to 10 of the periodic table are incorporated, thereby producing the hydrogenation catalyst;

wherein the specific surface area of the hydrogenation catalyst is 200 $m^2/g$ to 300 $m^2/g$.

* * * * *